E197A XR 3,668,304

SR

United States Patent

Eilenberger 3,668,304

[45] *June 6, 1972

[54] SINGLE PICKUP TUBE COLOR TELEVISION CAMERA

[72] Inventor: Robert Lewis Eilenberger, Colts Neck Township, Monmouth County, N.J.

[73] Assignee: Bell Telephone Laboratories, Incorporated, Murray Hill, N.J.

[ * ] Notice: The portion of the term of this patent subsequent to Oct. 13, 1988, has been disclaimed.

[22] Filed: June 29, 1970

[21] Appl. No.: 50,571

[52] U.S. Cl. ....................178/5.4 ST, 178/5.4 E, 350/173

[51] Int. Cl. ....................H04n 9/06

[58] Field of Search....................178/5.4 O, 5.4 ST, 5.4 TC; 350/169, 170, 171, 172, 173, 166

[56] References Cited

UNITED STATES PATENTS

| | | | |
|---|---|---|---|
| 2,560,351 | 7/1951 | Kell et al. | 350/171 |
| 2,733,291 | 1/1956 | Kell | 178/5.4 ST |
| 3,202,039 | 8/1965 | De Lang et al. | 350/173 |

*Primary Examiner*—Robert L. Richardson
*Assistant Examiner*—Richard P. Lange
*Attorney*—R. J. Guenther and E. W. Adams, Jr.

[57] ABSTRACT

In a multiple-image/single-tube color camera an arrangement of air spaced dichroic layers splits image-forming white light into three distinct-color parallel beams. Fiber optic material is used to translate all of the color beams to a common target plane of the pickup tube upon which the photoconductive surface is deposited. In one embodiment the faceplate of the tube is a composite of fiber optic material and homogeneous glass. In another, the faceplate is formed exclusively of fiber optic material.

8 Claims, 4 Drawing Figures

INVENTOR
R. L. EILENBERGER
BY David L. Hurewitz
ATTORNEY

SINGLE PICKUP TUBE COLOR TELEVISION CAMERA

BACKGROUND OF THE INVENTION

This invention relates to color television camera systems, and more particularly to a multiple-image/single-pickup-tube color television camera.

In deriving the several signals necessary for color television transmission, the typical practice has been to extract from the composite light coming through the camera lenses the primary light colors (e.g., red, blue and green) of the scene to be televised. Separate primary images are then formed at individual camera pickup tubes. In addition to the known technical difficulties of systems of this nature the cost alone is formidable — particularly so if the three color cameras are image/orthicon tubes.

Single pickup tube color television camera arrangements have been proposed before. The prior art arrangements, however, appear to suffer in one or more respects. Typically, they use color filters which pass the desired color components and absorb the others. Color separation is thus achieved, but there is an appreciable loss of light resulting in great inefficiency.

The use of dichroic interference layers for color separation has been suggested. They are used, for example, in a three tube system disclosed in U.S. Pat. No. 3,471,634, issued to W. J. R. Clark et al., Oct. 7, 1969. Dichroic materials are typically deposited upon substrates of plane parallel glass slabs and systems employing them are generally more efficient than those using absorption color filters for color separation. However, due to the thickness of the substrate and the numerous glass/air interfaces, these systems suffer from the problems of astigmatism, coma, ghost images, etc. and are bothersome unless additional corrective optical elements are bothersome unless additional corrective optical elements are incorporated. The inclusion of such corrective elements, however, makes the system excessively large and introduces additional thick substrates and their glass/air interfaces.

The dichroic layer color splitting mechanism inherently creates differences in optical paths, and as can be seen, for example, in the Clark patent the three color images are focused in two different planes. This is irrelevant where a separate pickup tube is used for each color image as is common in the prior art, but the multiplicity of planes poses an insurmountable problem where a single tube is used, since all three images must be focused on a common plane which constitutes the target of the single pickup tube.

It is the specific object of this invention to provide a single-tube color camera in which color separation is achieved with substantial reduction of the above-mentioned optical problems caused by the thick substrates and their interfaces with air and in which the three individual color images are formed on the single plane of the pickup tube target.

SUMMARY OF THE INVENTION

A crossed dichroic type of color image separator has the definite advantages of simplicity, together with a numerical aperture favorable for use with moderate light levels. The present inventor's copending patent application, Ser. No. 771,784, filed Oct. 30, 1968, now U.S. Pat. No. 3,534,159 issued Oct. 13, 1970, discloses a prism assembly coupled to a composite faceplate which utilizes a fiber optic material in combination with homogenous glass to bring the various color separated images into a common focus plane on the rear surface of the faceplate. In that application, the prism system with plane parallel entrance and exit faces was adopted in order to eliminate astigmatism and ghost images. It is true that when the substrate material on which the dichroic coatings are deposited has an appreciable thickness, these aberrations are quite apparent. However, these aberrations will be reduced almost directly with the reduction in thickness of the substrate, and if the substrate material can be made sufficiently thin, the dichroic coatings deposited on a thin flat substrate will provide useful and undistorted color separation.

Instead of burying the dichroic coatings within a glass prism as in the previous application, the reflective coatings are, in accordance with the present invention, placed on thin substrates, e.g., thin glass plates or pellicles, which are arranged to form air spaces between the reflectors. It has been experimentally determined that an air interface with the conventional multiple-layer dichroic coating results in a bandpass characteristic having steep, clean skirts which provide high selectivity, and hence, such an interface is very attractive for color separation.

The air-spaced reflectors include a pair of crossed dichroics, positioned at angles of incidence of 45 degrees to the principal axis of the incoming light flux, and serving to separate the red and blue components of the light flux and to deflect these components at an angle of 90 degrees to the principal axis. Second reflectors in the red and blue paths, also at 45 degrees, serve to reestablish the principal axes of these components parallel to, but displaced from, the principal axis of the remaining undeflected green component. The resultant side path offset in the beam paths causes the red and blue images to be focused in one plane while the third (green) image is focused in another plane further from the objective lens.

This dual focusing plane problem is corrected by employing a fiber optic section which translates the appropriate images to a common plane. In the above-mentioned prismatic separator, the composite vidicon faceplate is composed of sections of optical fibers and homogeneous glass, and the fiber optic material in the side paths is made exactly as thick in linear dimension as the offset in order to compensate for the offset within the prism. In addition, the central glass portion is the same linear dimension and of the same index of refraction as the prism assembly in order to assure that image ray refraction is equal in all paths. In the present invention, the dimension of the fiber optic material must similarly have a linear dimension equal to the side path offset, but since the image separating assembly is air-spaced and utilizes thin substrates, the refraction equalization is unnecessary. In order to ensure the integrity of the pickup tube, a solid faceplate is necessary and the required central portion, which may be, for example, glass or fiber optic material, may have a dimension determined exclusively by the structural requirements. If the central material is refractive, such as glass, a material of similar index and identical linear dimension should be placed in the path of the extracted images to equalize the refraction in all paths.

DETAILED DESCRIPTION

Figure 2:
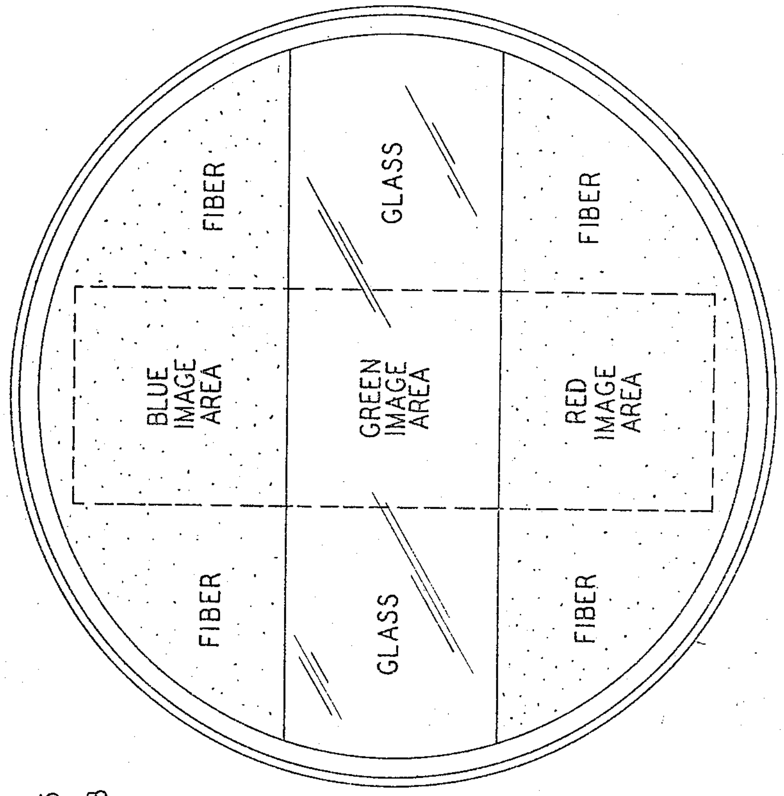
FIG. 2 is a sectional view taken on the line 2—2 of FIG. 1.
Figure 1:
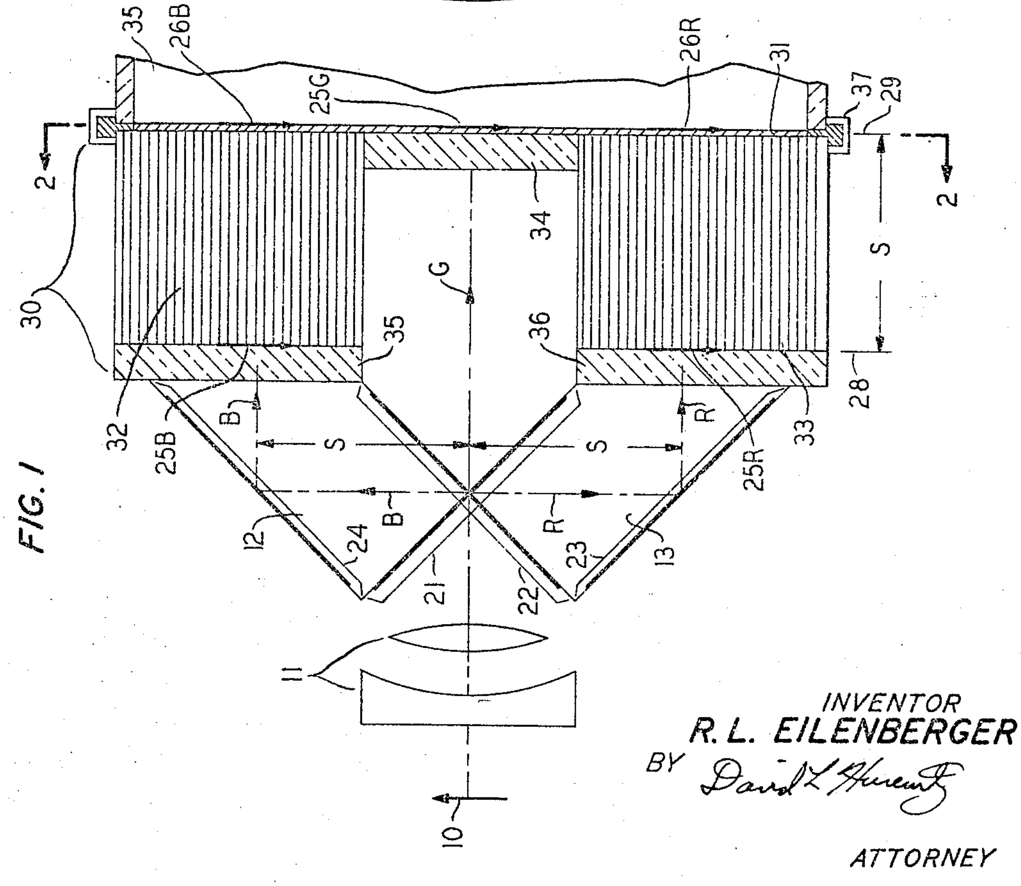
FIG. 1 is a diagrammatic representation in elevation of a color separating optical assembly for a single-pickup-tube color television camera in accordance with one embodiment of the present invention.

As illustrated in FIG. 1 the light from an object scene represented by arrow 10 passes through an object lens system 11 to the color separating assembly constructed in accordance with the principles of the present invention. The lens system, symbolically illustrated by lenses 11, preferably comprises a retrofocus telephoto lens, such as that made by Angenieux and others. The present invention, however, is in no way limited to such a lens system and other lenses may be advantageously utilized in conjunction with the present invention. An alternative lens system could be formed by a normal objective forming an image in the plane of a format shaping aperture, with image transfer then carried out by means of a relay lens.

The color separating assembly consists of four plane reflecting surfaces. Diagonal surfaces 21 and 22 are positioned perpendicular to one another and each is oriented at 45 degrees to the central optical axis of lens assembly 11. External surfaces 23 and 24 are aligned parallel to surfaces 21 and 22, respectively. Surfaces 21 and 22 are coated with dichroic layers, the coating on surface 21 being reflective to red and the coating on surface 22 being reflective to blue, and both, of course, passing substantially all other colors. Surfaces 23 and 24 are coated to reflect the same light that is reflected by its parallel member 21 or 22, and these coatings may be dichroic but, of course, may be totally reflecting as well. The dichroic material of crossed surfaces 21 and 22 is bonded to transparent substrates which are extremely thin, on the order of a few mils, so that they produce only slight refraction which can be ignored. The thin substrates must be structurally capable of maintaining their proper orientation in the air-spaced arrangement, and suitable substrates may be, for example, thin plates of homogenous glass or pellicles of membranes. These latter may be films of cellulose acetate, films of the polyethylene terephthalate family, such as Cronar and Mylar, or the equivalent stretched on rigid frames.

Figure 4:
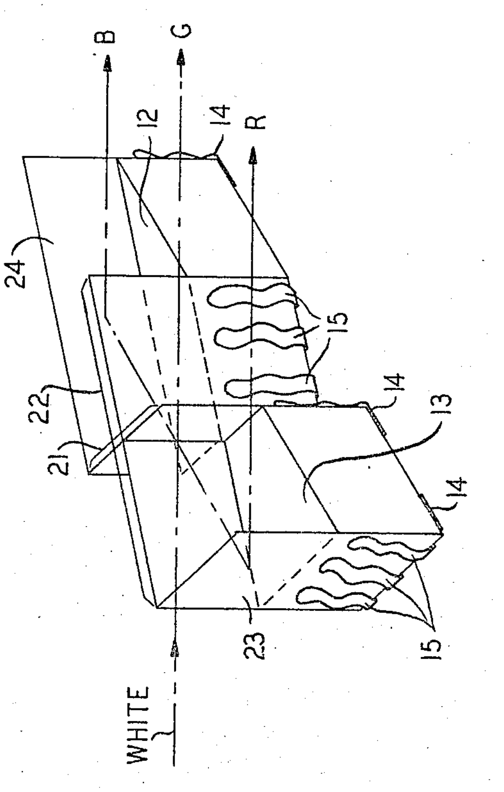
FIG. 4 is a representation in perspective of the air-spaced dichroic arrangement of FIGS. 1 and 3.

A support structure comprising two identical blocks 12 and 13 serves as a compound mount for the various coated substrates in the air-spaced arrangement. This structure can be seen most clearly in the prospective view of FIG. 4. Blocks 12 and 13 must be dimensioned with sufficient accuracy to position the surfaces 21 through 24 correctly with respect to each other, so that surfaces 21 and 23 are parallel to each other and perpendicular to surfaces 22 and 24 which are positioned parallel to each other. Mounting blocks which are cast will provide a sufficiently accurate pattern and the thin glass plates or other supporting substrates could be pressed against the exterior edges of the mounting blocks by springs, such as the multiple fingers 15 on spring assemblies 14 which are secured to the undersides of block 12 and 13. The accuracy of the air-spaced assembly is premised upon a precise abutting of the surfaces with the exterior edges of blocks 12 and 13 and these edges must be accurately machined and spring 14 must provide even pressure along the whole length of the substrate. For structural strength a substantial portion (such as ½) of the substrate should be in contact with the block and, of course, the optical coating is placed only on the remaining portion of the substrate.

The four reflective surfaces are arranged to form three parallel output color beams, labeled B, G and R, for blue, green and red, respectively, with the principal axis of each parallel to the optical axis of lens 11. A red image is reflected by the cross dichroic layer on surface 21 and by reflecting surface 23; a blue image is reflected by the cross dichroic layer on surface 22 and external reflector 24 and a green image is passed along the original spectral path through crossed dichroic layers on surfaces 21 and 22. The optical axes illustrated in the figures are representative of the central portion of the respective images.

For purposes of explanation of the invention, it will be assumed that blue reflective dichroic material is deposited upon diagonal surface 22 and red reflective dichroic material is deposited along diagonal surface 21. Either dichroic can, however, be deposited along either plane as the separation or optical action is completely symmetrical. The deposit is simply one of coating either of the surfaces 21 or 22 forming the crossed pair.

A red, blue and green primary color system is the one most often encountered in this art. However, other color systems have been proposed and accordingly the description of the invention will proceed on the basis of red, blue and green color separation. The principles of the invention are in no way limited thereto. All that is necessary to adapt the invention to a three color system other than red, green and blue, is that the dichroic reflective materials be changed accordingly.

The crossed dichroic assembly is positioned in the path of incident optical energy with the diagonal surfaces 21 and 22 deposited to deflect the selected portions, such as red and blue light, respectively, at right angles to the path of travel. As shown in the drawing, the common vertex or line of intersection of the diagonal planes is on the offset axis of the incident light. As shown by way of example in FIG. 1, the blue light in the spectrum of incident optical energy is deflected at right angles in the upward direction, the red light in the spectrum is deflected at right angles in the downward direction, and the remaining unreflected light, which is essentially green, passes through the dichroic layers.

The red reflectivity of dichroic layer on surface 21 is complementary to that of the red reflective surface 23 and the blue reflective surface 22 is likewise complementary to the blue reflective surface 24. That is, the dichroics are of selectively different spectral characteristics so as to complement each other and provide the desired overall bandpass characteristic. For example, the complementary blue dichroic reflector 22 takes care of the fact that the primary blue reflector characteristic which shapes the transmission of the short wavelength side of the green typically leaves much too wide a spectral transmission for the blue image. The complementary blue reflector is therefore designed to pass the long wavelength side of the blue light to the desired characteristics, and similarly, complementary design is provided for the reflectors of the red image.

It is apparent that light travels the longest distance over either of the side paths B and R, as compared with the straight through central path G. This means that if lens system 11 is positioned to form the images (25B and 25R) on a plane 28, then the third green image (25G) will be focused in plane 29 a distance S beyond plane 28. The separation distance S between the planes is equal to the side path offset.

Faceplate 30 of camera pickup tube 35 is formed with fiber optic sections 32 and 33 to transfer the offset images to the single plane 29 in which a photoactive material constituting target 31 is placed. As is known to those in the art, fiber optic material, such as 32 and 33, comprises a multitude of tightly packed, parallel aligned, slender fibers, of glass or the equivalent, held together in a preferably dark cladding; such material is made by the Corning Glass Works, and others. In a preferred embodiment, the individual fibers are of substantially square cross-section approximately 6 microns on a side, in order to provide a higher packing fraction. The fibers function as individual "light pipes" and serve to transfer the light incident at one end thereof to the remote end. This transfer of light images from one plane to another is a known and widely used function of fiber optic blocks. The image transfer is essentially free of distortion and, as should be noted, contributes no path lengthening effect, such as is inherent with homogeneous glass blocks as a result of the refraction of incident light. It is this latter feature which is advantageously utilized herein.

The faceplate 30 must provide a solid surface across the front of tube 35 and may be formed having a central portion 34 of homogeneous glass of the normal vidicon faceplate thickness, for example, 0.100 inch. Optical fiber sections 32 and 33, which serve only to convey images 25B and 25R from plane 28 to plane 29, where they are designated 26B and 26R, respectively, have a linear dimension equal to the offset distances. Equal amounts of glass of index similar to the central portion 34 are desired in all paths in order that the refraction be similar for all colors. Therefore, blocks 35 and 36 of a material substantially similar in index and thickness to the central portion 34, are inserted in the red and blue paths in advance of the fiber optic sections (preferably abutting the entry faces of the fiber optic sections 32 and 33).

As an assemblage of optical fibers cannot serve to form an image but can only transfer an already formed and focused image from one plane to another, the sections 35 and 36 of homogeneous glass in the side paths cannot be placed on the output side of the fiber optic sections. This would result in a scattering of the image light at the exit face and therefore the required glass is placed on the input side of the fiber optic section.

The practical form which a composite faceplate for use with air-spaced dichroic reflectors would take is illustrated in FIG. 1. The fiber optic sections and the central homogeneous glass section are joined in some fashion so as to be vacuum tight in order to maintain the integrity of the pickup tube. Connecting ring 37 joins the faceplate 30 with tube 35 and provides the required electrical connection with the photoactive material of target 31.

Figure 3:
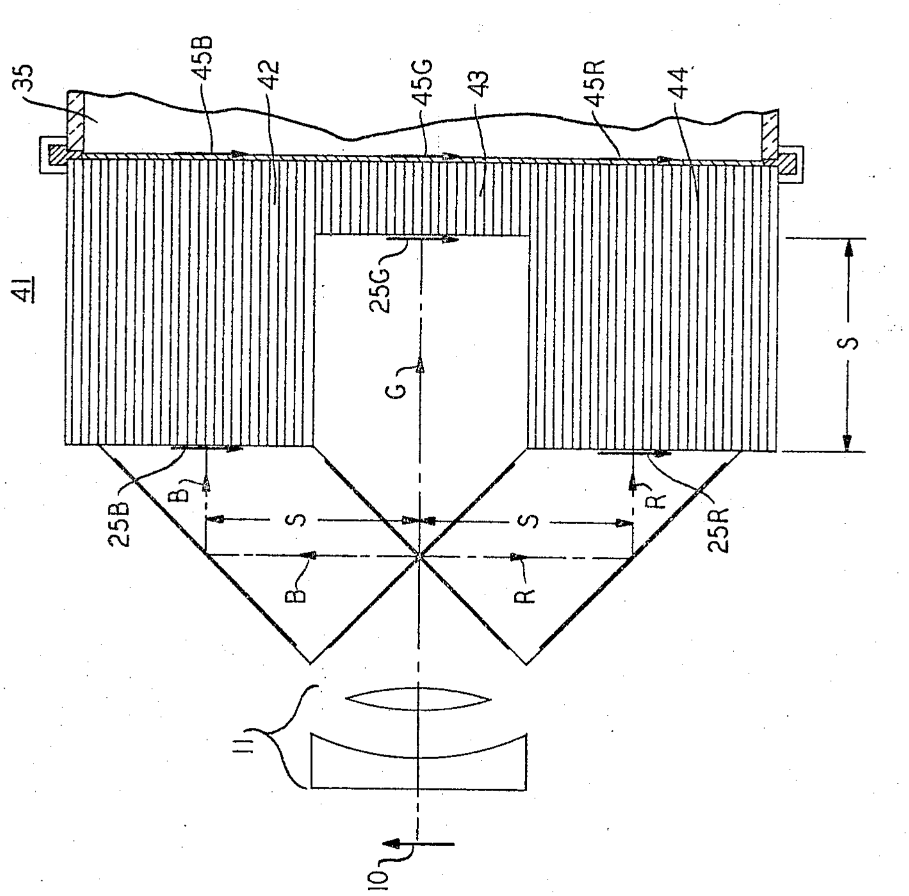
FIG. 3 is a diagrammatic representation in elevation of an alternative embodiment of the present invention.

In addition to the composite assembly discussed above, it is also possible to form a unitary assembly illustrated in FIG. 3 in which fiber optic material 41 is used exclusively as a faceplate. Lens system 11 forms images 25B and 25R at the entry faces of sections 42 and 44, respectively, of fiber optic block 41. The thin central section 43 of the fiber optic block is dimensioned so that the green image 25G is focused at the entry face of this thin central portion. Central section 43 is of relatively small linear dimension, sufficient, however, to maintain a vacuum in tube 35. The central image 25G is transferred by central fiber optic section 43, and the side path images 25B and 25R are conveyed through portions of fiber optic material 41, whose linear dimensions are greater than the linear dimension of the central fiber optic section 43 by the length of the side path offset S. This alternative structure, which forms all three images designated 45B, 45G and 45R in a single plane constituting target 46 of tube 35, may be simply fabricated since it requires no glass-fiber optic interfaces.

With the exception of the faceplate, the camera tube can be similar to the vidicon tubes conventionally used and the multiple-image/single-pickup-tube color television camera described herein is of particular utility in a color video telephone station set, such as the PICTUREPHONE visual telephone set, where the impracticability of more than one pickup tube is obvious but, of course, the invention is in no way limited thereto. In addition, instead of the typical photoconductive surface used in a conventional vidicon tube, a matrix of silicon diodes can be utilized as the photoactive surface; as is the case in the recently developed solid-state picture tube; see, for example, T.M.Buck-M.H.Crowell-E.I.Gordon, U.S. Pat. No. 3,403,284, issued Sept. 24, 1968.

In all cases it is to be understood that the above-described arrangements are merely illustrative of a small number of the many possible applications of the principles of the invention. Numerous and varied other arrangements in accordance with these principles may readily be devised by those skilled in the art without departing from the spirit and scope of the invention.

What is claimed is:

1. A color television camera comprising:

a single pickup tube, a pair of thin crossed diagonal surfaces of optically transparent material positioned in the path of incident light rays with the diagonal surfaces disposed to deflect selected portions of the incident light at right angles to the path of the incident light and with the line of intersection of the diagonal surfaces at the optical axis of the incident light, a pair of selected dichroic layers respectively contiguous with said diagonal surfaces and each layer serving to reflect a distinct color component of the incident light, a pair of symmetrically disposed reflecting surfaces, respectively parallel to said diagonal surfaces, each serving to further reflect a distinct color component reflected by the one of said diagonal surfaces, and a faceplate for focusing all color components of the incident light on the target of said tube, said faceplate including at least two sections of fiber optic material, each serving to transfer a further reflected color component to the target.

2. In a color television camera as claimed in claim 1, a pair of identical mounting blocks, each block having three successive exterior edges perpendicular to adjacent ones of the three edges, and means for securing to each of the edges one of said surfaces such that a portion of the surface abuts the edge of the block and the remaining portion extends beyond the block, forming an air-spaced arrangement of the surfaces consisting of said pair of symmetrically disposed reflecting surfaces respectively parallel to said diagonal surfaces, said dichroic layers being disposed on the portion of said diagonal surfaces extending beyond the block.

3. A color television camera as claimed in claim 2 wherein said faceplate includes, two substantially similar sections of fiber optic material for transferring images focused on their entry faces to their respective exit faces, a central portion of homogenous transparent material joined to said sections of fiber optic material so that its exit face forms a vacuum tight plane with the exit faces of the two fiber optic sections, and a block of homogeneous transparent material, having the same thickness and same index of refraction as the central portion of material, abutting the entry face of each of the two fiber optic sections, the composite faceplate being oriented such that each of said further reflected color components pass through a block of homogeneous material and are focused on the entry faces of the sections of fiber optic material and the color components unreflected by the pair of dichroic layers pass through the central homogenous material and are focused in the plane formed by the exit faces of the central homogeneous material and the two sections of fiber optic material.

4. A color television camera as claimed in claim 2 wherein said faceplate consists of a unitary block of fiber optic material having three sections, including one central section and two other sections having a linear dimension greater by the length of the offset in the paths of said further reflected color components than the linear dimension of the central section, said sections being arranged to form a common plane containing the exit faces of the three sections, said faceplate being oriented so that the color components unreflected by the pair of dichroics are focused on the entry face of the central section and the further reflected color components are focused on the entry faces of the other two sections respectively, whereby all color components of the incident light are focused on the common plane.

5. A color television camera comprising:

a single pickup tube;

an optical separation assembly including a pair of thin crossed diagonal surfaces of optically transparent material positioned in the path of incident light rays with the diagonal surfaces disposed to deflect selected portions of the incident light at right angles to the path of the incident light and with the line of intersection of the diagonal surfaces of the optical axis of the incident light, a pair of symmetrically disposed surfaces which are respectively parallel to said diagonal surfaces;

a first pair of selected dichroic layers coating said diagonal surfaces and serving to reflect distinct color components of the incident light, a second pair of dichroic layers coating said pair of parallel surfaces and having reflectivities which respectively complement the reflectivities of said first pair of dichoic layers disposed parallel thereto, and serving to further reflect a distinct color component reflected by one of said first pair of dichroic layers; and a faceplate whose exit face constitutes the plane of the target of said tube, said faceplate including at least two sections of fiber optic material each serving respectively to transfer a further reflected color component to the plane of said target so that all color components of the incident light are focused in that plane.

6. In a color television camera as claimed in claim 5, a pair of identical mounting blocks, each block having three successive exterior edges perpendicular to adjacent ones of the three edges, and means for securing to each of the edges one of said surfaces such that a portion of the surface abuts the edge of the block and the remaining portion extends beyond the block, forming an air-spaced arrangement of the surfaces consisting of said pair of symmetrically disposed surfaces respectively parallel to said diagonal surfaces, said dichroic layers coating the portions of said surfaces beyond the block.

7. A color television camera as claimed in claim 5 wherein said faceplate includes, two substantially similar sections of fiber optic material for transferring images focused on their entry faces to their respective exit faces, a central portion of homogeneous transparent material joined to said sections of fiber optic material so that its exit face and the exit faces of the two fiber optic sections form a vacuum tight plane of said target, and a block of homogeneous transparent material, having the same thickness and same index of refraction as the central portion of material, abutting the entry face of each of the two fiber optic sections, the composite faceplate being oriented such that each of said further reflected components pass through a block of homogeneous material and are focused on the entry faces of the sections of fiber optic material and the color components unreflected by the pair of dichroic layers pass through the central homogeneous material and are focused in the plane of said target.

8. A color television camera as claimed in claim 5 wherein said faceplate consists of a unitary block of fiber optic material having three sections, including one central section and two other sections having a linear dimension greater by the length of the offset in the paths of said further reflected color components than the linear dimension of the central section, said sections being arranged to form a common plane containing the exit faces of the three sections, said faceplate being oriented so that the color components unreflected by the pair of dichroics are focused on the entry face of the central section and the further reflected color components are focused on the entry faces of the other two sections respectively, whereby all color components of the incident light are focused on the common plane.

* * * * *